US006861945B2

United States Patent
Kim et al.

(10) Patent No.: US 6,861,945 B2
(45) Date of Patent: Mar. 1, 2005

(54) INFORMATION INPUT DEVICE, INFORMATION PROCESSING DEVICE AND INFORMATION INPUT METHOD

(75) Inventors: Sung-cheol Kim, Seoul (KR); Sang-goog Lee, Anyang (KR); Ji-hun Koo, Cheonan (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 53 days.

(21) Appl. No.: 10/376,592

(22) Filed: Mar. 3, 2003

(65) Prior Publication Data

US 2004/0032346 A1 Feb. 19, 2004

(30) Foreign Application Priority Data

Aug. 19, 2002 (KR) ................................ 10-2002-0048973

(51) Int. Cl.[7] .................................................. H04B 3/36
(52) U.S. Cl. ................................ 340/407.1; 340/407.2; 345/474
(58) Field of Search .......................... 340/407.1, 407.2, 340/540; 345/156, 157, 158, 168, 474; 382/106, 154; 84/600, 658, 666

(56) References Cited

U.S. PATENT DOCUMENTS

| | | | | |
|---|---|---|---|---|
| 5,097,252 A | * | 3/1992 | Harvill et al. | 340/540 |
| 5,512,919 A | * | 4/1996 | Araki | 345/156 |
| 5,880,712 A | * | 3/1999 | Goldman | 345/168 |
| 6,232,960 B1 | * | 5/2001 | Goldman | 345/168 |
| 6,515,669 B1 | * | 2/2003 | Mohri | 345/474 |
| 6,744,420 B2 | * | 6/2004 | Mohri | 345/157 |

FOREIGN PATENT DOCUMENTS

| | | |
|---|---|---|
| KR | 1998-036078 A | 8/1998 |
| KR | 2000-0032308 A | 6/2000 |
| KR | 2002072081 A * | 9/2002 |

* cited by examiner

Primary Examiner—Van T. Trieu
(74) Attorney, Agent, or Firm—Sughrue Mion, PLLC

(57) ABSTRACT

An information input device worn on a user's body or finger, an information processing device and an information input method are provided. The information input device which is capable of being worn on a user's body includes a distance sensing unit which senses changes in distance between a predetermined portion and another predetermined portion of the user's body according to the extent of bending of the user's body joint; and a signal processing unit which determines and processes information input items from the distance sensed by the distance sensing unit.

27 Claims, 14 Drawing Sheets

INFORMATION INPUT DEVICE, INFORMATION PROCESSING DEVICE AND INFORMATION INPUT METHOD

BACKGROUND OF THE INVENTION

This application claims the priority of Korean Patent Application No. 2002-48973, filed Aug. 19, 2002, which is incorporated herein in its entirety by reference.

1. Field of the Invention

The present invention relates to an information input device worn on a user's body or finger, an information processing device, and an information input method.

2. Description of the Related Art

One of the most important factors contributing to the effective use of a computer is an interface between the computer and a person using it. The most widely used computer interface device is a QWERTY keyboard, which has a plurality of keys each corresponding to a particular character or symbol. However, recently, instead of the QWERTY keyboard, a virtual keyboard has been developed for a user's convenience and portability purposes.

Korean Utility Model Application No. 1996-33413, entitled "Computer System Having Virtual Keyboard" uses a mouse or touch pad for selecting a key on a virtual keyboard which is displayed in a popup window on a monitor of a computer. However, a drawback of the above computer system is that a process of pushing keys for a long time becomes troublesome and tiring. Also, it takes a long time to select the keys.

U.S. Pat. No. 5,581,484, entitled "Finger Mounted Computer Input Device", issued on Dec. 3, 1996 includes a pressure sensor and a pair of acceleration sensors. The pressure sensor and the acceleration sensors are attached to a user's fingertip. If the user's finger presses against a predetermined surface of the computer input device, the pressure sensor senses a pressure and the acceleration sensors measure the acceleration of the finger. Signals of the sensors are used in calculating a relative position of the finger. Integrating a measured acceleration twice gives the relative position of the finger. The pressure signal is used in validating an acceleration signal. However, a drawback of the above information input device is that errors are generated in the acceleration signal outputted from the acceleration sensor by errors included in the acceleration sensor and the acceleration of gravity.

U.S. Pat. No. 6,304,840, entitled "Fingerless Glove for Interacting with Data Processing System", issued on Oct. 16, 2001 includes a sensor which senses a bending of the user's finger joints. As shown in FIG. 1, an angle θ at which the joint 100 of the user's finger is bent is used to decode a particular row of a keyboard and each finger controls one or more columns. Discrimination between the columns of the keyboard by the same finger is achieved by an adduction/abduction sensor.

The above fingerless glove has an effect which prevents errors by the acceleration sensor. However, a drawback of the fingerless glove is that since the sensor measuring the extent of bending of the user's finger joint must cover the joint portion of the user's finger, an area of the finger contacting with the sensor is wide and, as such, a user wearing the glove may experience discomfort. Another drawback is that repeated bending and stretching operations of the finger for information selection promote abrasion of the sensor mounted on the joint portion of the finger.

SUMMARY OF THE INVENTION

The present invention provides an information input device with improved comfort and durability, an information processing device and an information input method.

According to one aspect of the present invention, there is provided an information input device capable of being worn on a user's body comprising a distance sensing unit which senses a change in the distance between a predetermined portion and another predetermined portion of the user's body according to the extent of bending of the user's body joint; and a signal processing unit which determines and processes information input items based on the distance sensed by the distance sensing unit.

According to another aspect of the present invention, there is provided an information input device capable of being worn on a user's hand comprising a distance sensing unit which senses a change in the distance between a first predetermined portion and second predetermined portion of the user's finger according to the extent of bending of the user's finger; and a signal processing unit in which information input items are determined based on the distance sensed by the distance sensing unit.

The first predetermined portion of the user's finger can be the third joint from the fingertip and the second predetermined portion can be a first or second joint from the fingertip.

Further, the information input items include characters, numerals and symbols.

The distance sensing unit is worn on the user's finger in the form of a ring or a glove.

A reflective sensor or an ultrasonic sensor can be used as the distance sensing unit.

When using a reflective sensor as the distance sensing unit, it is preferable that the signal processing unit includes a compensation unit which compensates for natural light in a signal indicating a distance sensed by the reflective sensor.

Further, the signal processing unit includes a finger position calculating unit which calculates a relative position of the finger based on the distance sensed by the distance sensing unit; and a position tracking unit which determines the calculated relative position of the finger corresponding to any item of the plurality of information input items, using a critical value.

It is preferable that the critical values can be adjusted according to the user's intention.

The information input device further comprises an acceleration sensing unit which senses an acceleration determining input of the selected information input item.

According to still another aspect of the present invention, an information processing device comprises an information processing unit; and an information input unit capable of being worn on a user's hand, including a distance sensing unit which senses a change in the distance between a first predetermined portion and a second predetermined portion of the user's finger according to the extent of bending of the user's finger, and a signal processing unit which determines and processes an information input item based on the distance sensed by the distance sensing unit.

The information processing unit further includes a mapping unit which maps the information input item determined by the position tracking unit into a value capable of being output to an output device, and a critical value adjusting unit which allows a user to set an intended critical value using a user interface.

Information processing devices include computers, personal digital assistants (PDA) and cellular phones.

According to still yet another aspect of the present invention, there is provided a method of inputting information including: sensing a change in the distance between a predetermined portion and another predetermined portion of a user's finger according to the extent of bending of the user's finger; and determining a selection of information input item using the sensed distance.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
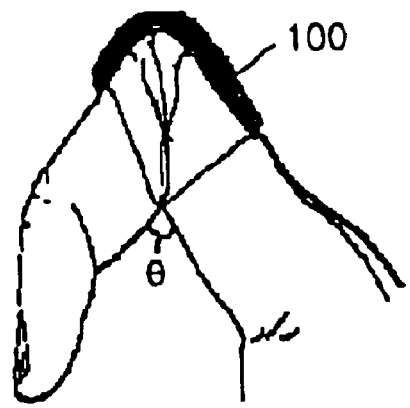
FIG. 1 is a diagram explaining a principal in which information is entered into a computer based on the extent of bending of a finger, according to the prior art.
Figure 2:
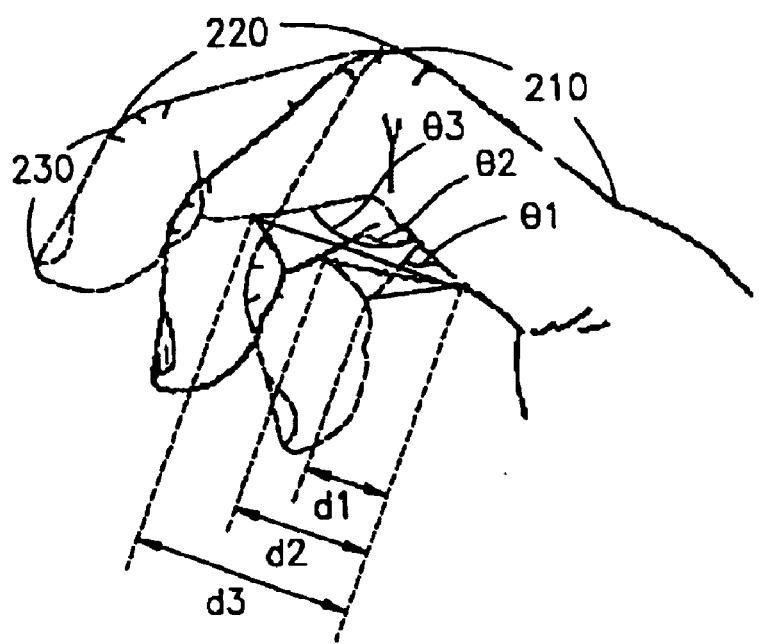
FIG. 2 is a diagram explaining a principal in which information is entered into a computer using changes in distance according to the extent of bending of a finger according to the present invention.

In FIG. 2, which shows changes in distance according to the extent of bending of the finger, a reference numeral 210 indicates a distance between a first joint and a second joint of a finger, and a reference numeral 220 indicates a distance between the second joint and a third joint of a finger. A distance d1, d2, d3, as shown in FIG. 2, can change according to the extent of bending of the finger. If the finger is bent by a large amount, that is, if an angle θ1 is small, a distance d1 can be short. If the finger is bent by a small amount, that is, if an angle θ3 is large, a distance d3 can be long.

The changes in distance according to the extent of bending of the finger are used to select keys of a key input device such as a keyboard. That is, each finger can correspond to one column of a key arrangement of the keyboard, and one row can be selected from the selected column using changes in distance according to the extent of bending of the finger. For example, in FIG. 2, the distance d3 can be used to select a first row from a particular column, a distance d2 can be used to select a second row the from the particular column and the distance d1 can be used to select a third row from the particular column.

While the present invention will be described using the first joint and the second joint of the finger, any joints of the finger may be used as long as the distance between the joints changes according to the extent of bending of the finger. Accordingly, it will be understood by those skilled in the art that a distance between the first joint and the third joint or a distance between the second joint and the third joint can be used to select all the keys of the keyboard.

Figure 3:
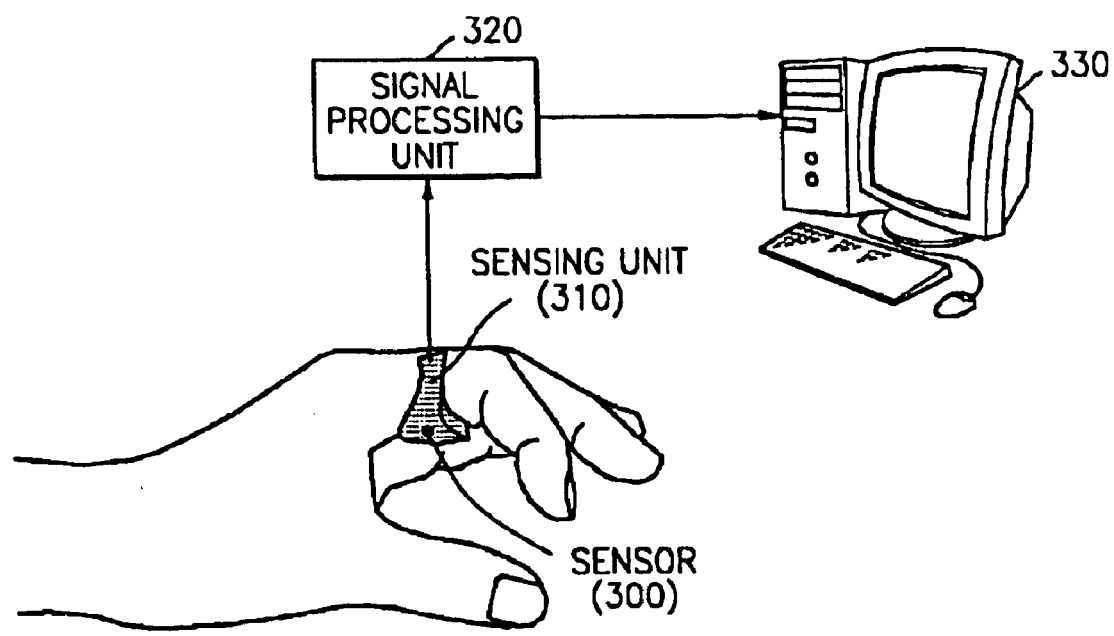
FIG. 3 is a diagram of an example of an information processing device according to the present invention.

An information processing device is described referring to FIG. 3. The information processing device of FIG. 3 includes a sensing unit 310 having a sensor 300, a signal processing unit 320 and a computer 330.

An electrical signal which indicates a distance between the predetermined portions of a user's finger is transmitted to the signal processing unit 320. The distance between the predetermined portions is sensed by the sensor 300. The signal processing unit 320 processes the electrical signal received from the sensor 300 as an information signal for inputting a computer key and sends the information signal to the computer 330. Then, the computer 330 maps the received information signal to a key value of a keyboard and outputs the key value through an output device. While only the computer is shown in FIG. 3, any device which processes information and outputs through an output device can be applied instead of the computer. For example, a PDA (personal digital assistants), a cellular phone and a portable terminal can be used.

The sensing unit 310 included in the information processing device of FIG. 3 is described referring to FIGS. 4A through 7.

Figure 4A:
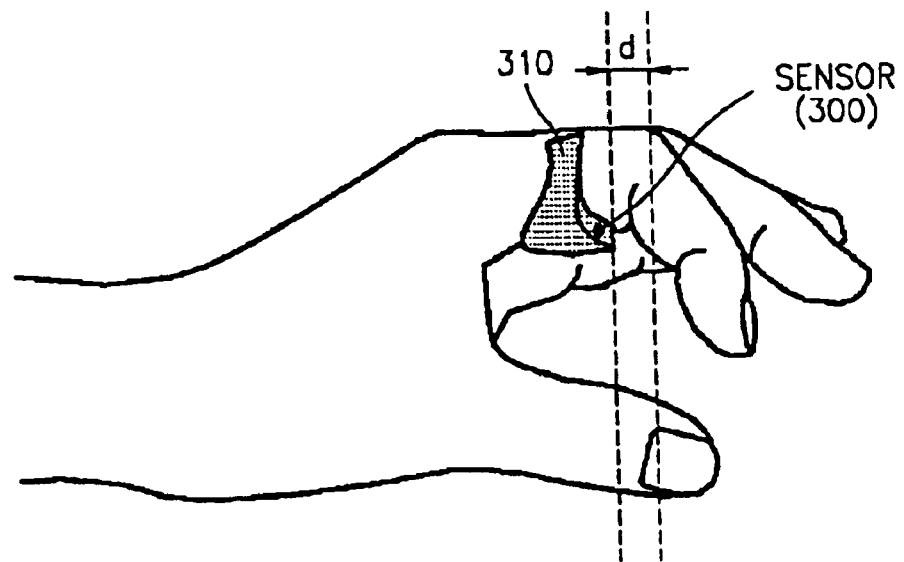
FIG. 4A is a diagram of an example of an information input device included in the information processing device of FIG. 3.

FIG. 4A shows an example of the sensing unit 310 for sensing changes in distance according to the extent of the bending of a finger.

The sensing unit 310 is worn on a first portion between a first joint and second joint of a user's finger. The distance sensing sensor 300 is mounted on the sensing unit 310 for sensing the above-described distances d1, d2, d3 of FIG. 2, for example. When explaining the position of the distance sensing sensor 300 using the user's hand, the distance sensing sensor 300 is mounted on the inside, i.e., on the palm side of the first portion of the user's finger. When the distance sensing sensor 300 is worn as described above, the distance d1, d2, or d3 between the distance sensing sensor 300 worn on the first portion and a second portion between the second joint and a third joint, is sensed.

Figure 4B:
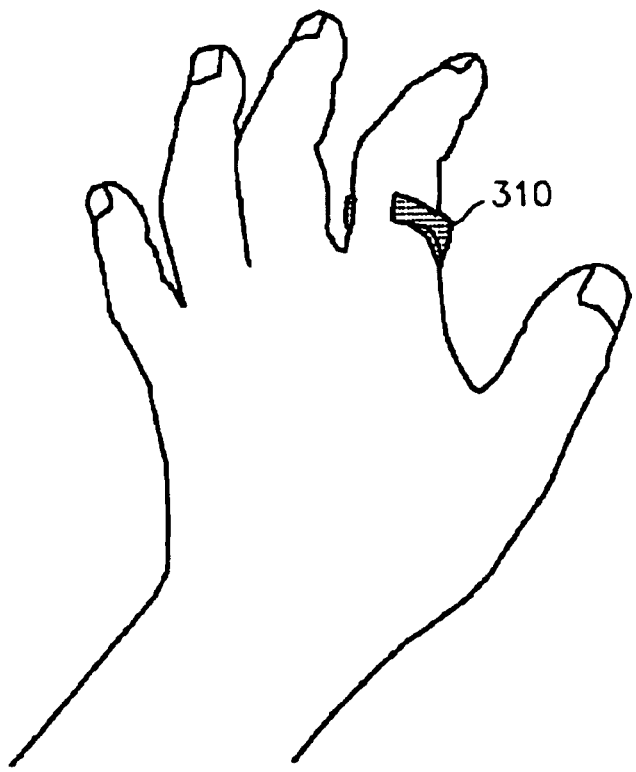
FIG. 4B is a diagram of the back of the user's hand on which the information input device of FIG. 4A is worn.
Figure 4C:
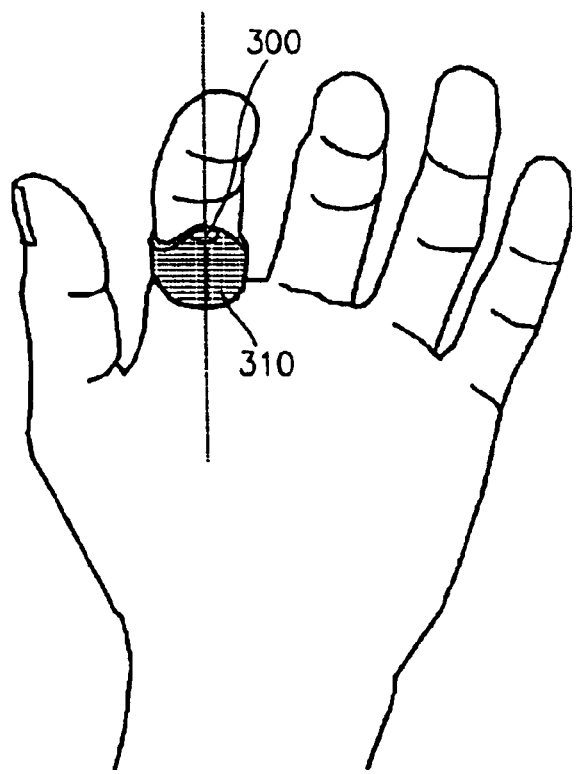
FIG. 4C is a diagram of the palm of the user's hand on which the information input device of FIG. 4A is worn.

FIGS. 4B and 4C show examples in which the sensing unit 310 is worn on the user's finger. FIG. 4B shows the back of a hand on which the sensing unit 310 is worn on the first portion of the user's index finger. FIG. 4C shows the palm of the hand on which the sensing unit 310 is worn on the first portion of the user's index finger. In order to accurately sense the distance d1, d2, or d3 between the distance sensing sensor 300 worn on the first portion and the second portion, it is preferable that the distance sensing sensor 300 is located at the center of the first portion of the user's finger on the palm side.

Figure 5:
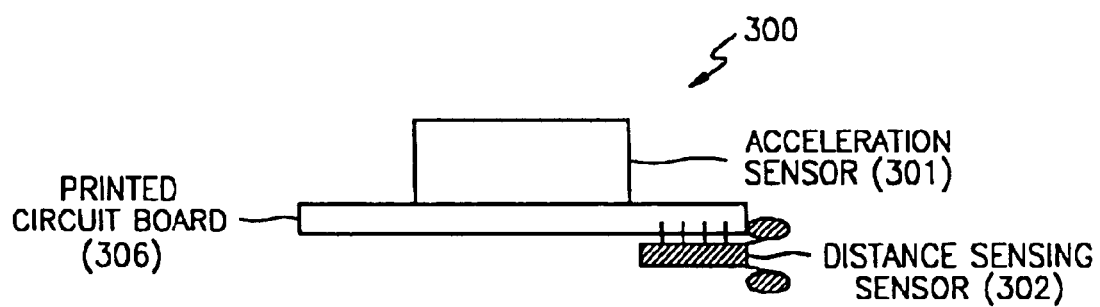
FIG. 5 is a diagram of an example of a sensor included in the information input device according to the present invention.

FIG. 5 is a configuration diagram of an example of the distance sensing means, that is, sensor 300 shown in FIG. 3. The sensor 300 includes an acceleration sensor 301, a distance sensing sensor 302 and a printed circuit board 306. The acceleration sensor 301 is mounted on an upper surface of the printed circuit board 306. The acceleration sensor 301 senses an acceleration when the user's finger is moved, and is used as a sensor for an information input such as a "click". The distance sensing sensor 302 is mounted on a lower surface of the printed circuit board 306. The distance sensing sensor 302 measures changes in distance between the finger joints when the user's finger is moved, and is used as a sensor for information selection. Although FIG. 5 shows only an example of configuration of the acceleration sensor 301 and the distance sensing sensor 302, various configurations can be applied.

Figure 6A:
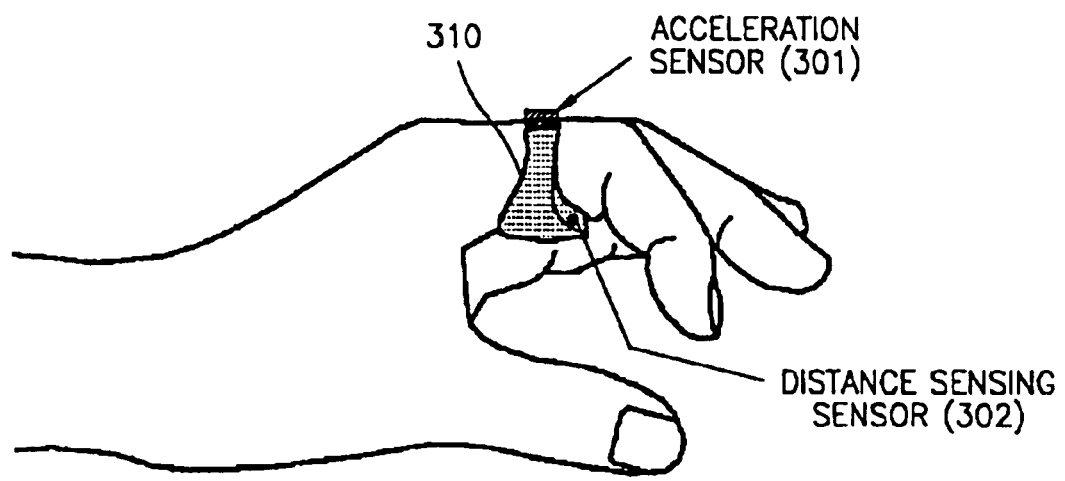
FIG. 6A is a diagram of an example of a position at which the sensor of FIG. 5 is mounted.
Figure 6B:
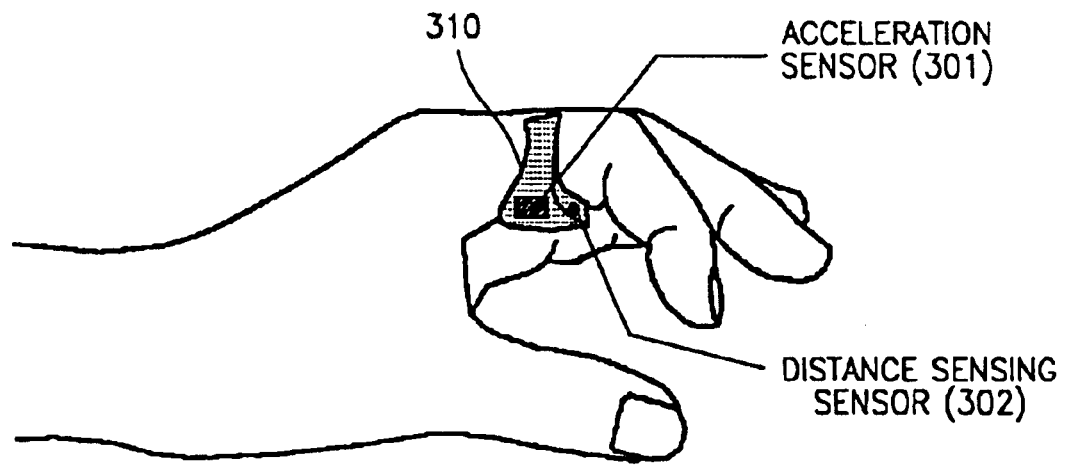
FIG. 6B is a diagram of another example of a position at which the sensor of FIG. 5 is mounted.

For example, while the acceleration sensor 301 and the distance sensing sensor 302 are integrally formed as shown in FIG. 5, the acceleration sensor 301 may be formed on an upper portion of the sensing unit 310 and the distance sensing sensor 302 may be formed on a lower portion of the sensing unit 310, as shown in FIG. 6A. Further, as shown in FIG. 6B, the acceleration sensor 301 and the distance sensing sensor 302 may be formed on a lower portion of the sensing unit 310. While any configuration can be used, it is preferable to use the configuration of FIG. 6A to improve the acceleration sensing effect of the acceleration sensor 301.

Figure 7:
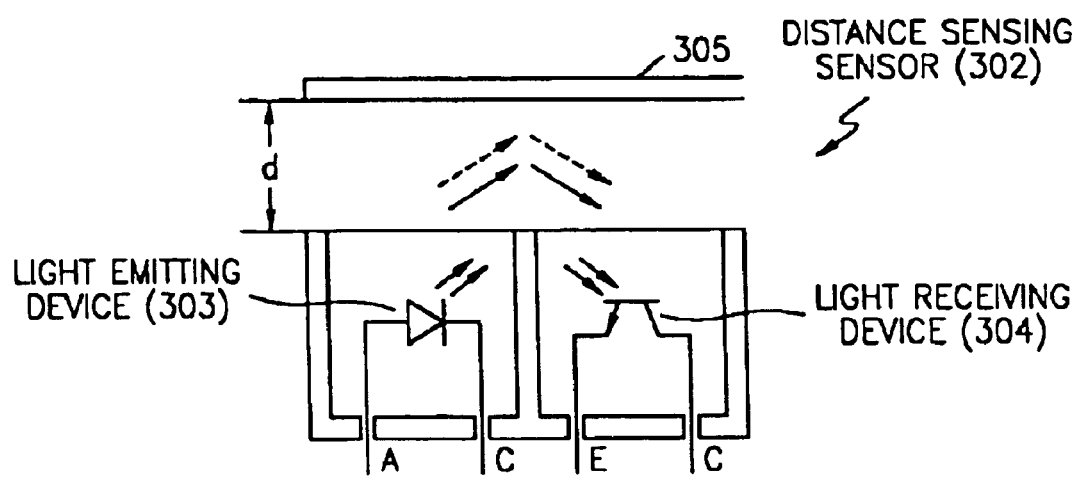
FIG. 7 is a detailed circuit diagram of a distance sensing sensor of FIG. 5.

Next, the distance sensing sensor 302 is described referring to FIG. 7.

Any sensor capable of sensing a distance can be used as the distance sensing sensor 302. For example, a reflective sensor or an ultrasonic sensor can be used.

A reflective sensor 302 of FIG. 7 includes a light emitting device 303 and a light receiving device 304. The principal of operation of the reflective sensor 302 is that changes in a light emitting signal generated by the interaction of the reflective sensor 302 with an object 305 causes changes in an electrical signal in a photoelectron receiver (not shown). In FIG. 7, the object 305 is referred to as a user's finger. If light is outputted from the light emitting device 303, the outputted light is reflected from the object 305 and is incident on the light receiving device 304. Here, the longer the distance between the sensor 302 and the object 305, the smaller the quantity of radiation which is incident on the light receiving device 304. Further, the smaller the distance between the sensor 302 and the object 305, the larger the quantity of radiation which is incident on the light receiving device 304.

According to the principal of the reflective sensor, if the user bends a finger for selecting information, the angles of the joints of the finger are changed according to the extent of bending of the finger, thereby changing the distance between the sensor and the finger. The greater the extent of bending of the finger the greater the amount of radiation received by the sensor. As a result, the signal of the sensor becomes larger. Further, the smaller the extent of bending of the finger, the smaller the quantity of radiation received by the sensor. As a result, the signal of the sensor becomes smaller. The extent of bending of the finger can be measured by using such a change in the quantity of radiation.

An ultrasonic sensor 302 can be used as another example of a distance sensing sensor. The principal of the ultrasonic sensor 302 is that if the ultrasonic sensor outputs an ultrasonic pulse toward the object, the object is recognized by receiving the ultrasonic wave reflected from the object. Distance information between the sensor and the object is obtained using the Doppler Effect. In the present invention, a distance measurement ultrasonic sensor for switching or reflecting can be used as the ultrasonic sensor.

Figure 8:
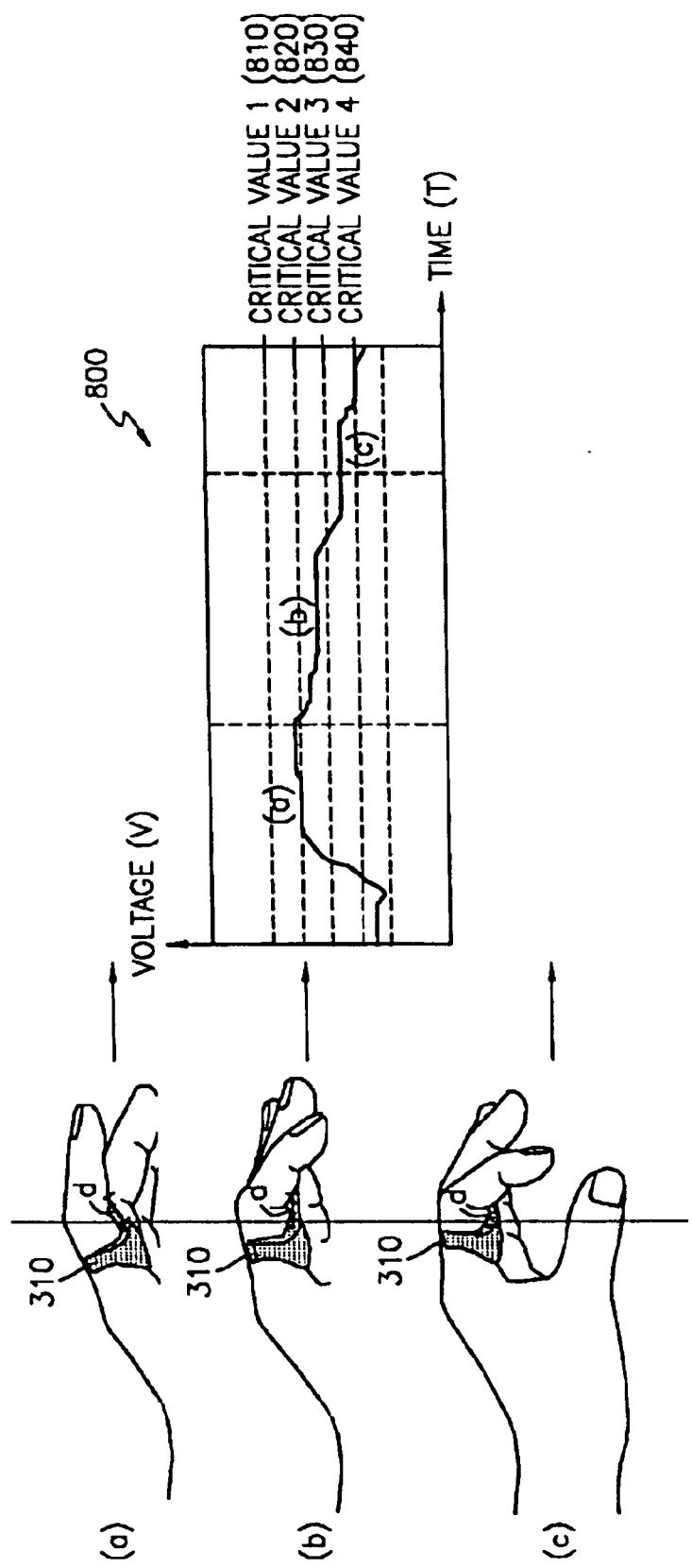
FIG. 8 is a voltage graph representing change in distance according to the extent of bending of a finger.

Referring to FIG. 8, a principal by which information input items are selected is described using the distance sensed by the distance sensing sensor. A predetermined voltage can be used as a signal indicating the distance sensed by the distance sensing sensor. That is, the distance between the joints is changed according to the extent of bending of the finger, and the voltage is changed according to charges in the distance. If a voltage indicating the distance between the sensor mounted on the predetermined joint of the user's finger and another joint is between a critical value 1 (810) and a critical value 2 (820), key 1 is selected. Further, if the voltage is between the critical value 2 (820) and a critical value 3 (830), key 2 is selected and if the voltage is between the critical value 3 (830) and a critical value 4 (840), key 3 is selected. The selected keys 1, 2 and 3 are mapped as key values of a key input device of a computer.

Keys 1, 2 and 3 correspond to keys of one column of a keyboard or keypad, and are used to select respective rows from the selected column. That is, each finger corresponds to a particular column, and changes in distance due to the movement of each finger are used to select one row of the particular column.

Figure 9A:
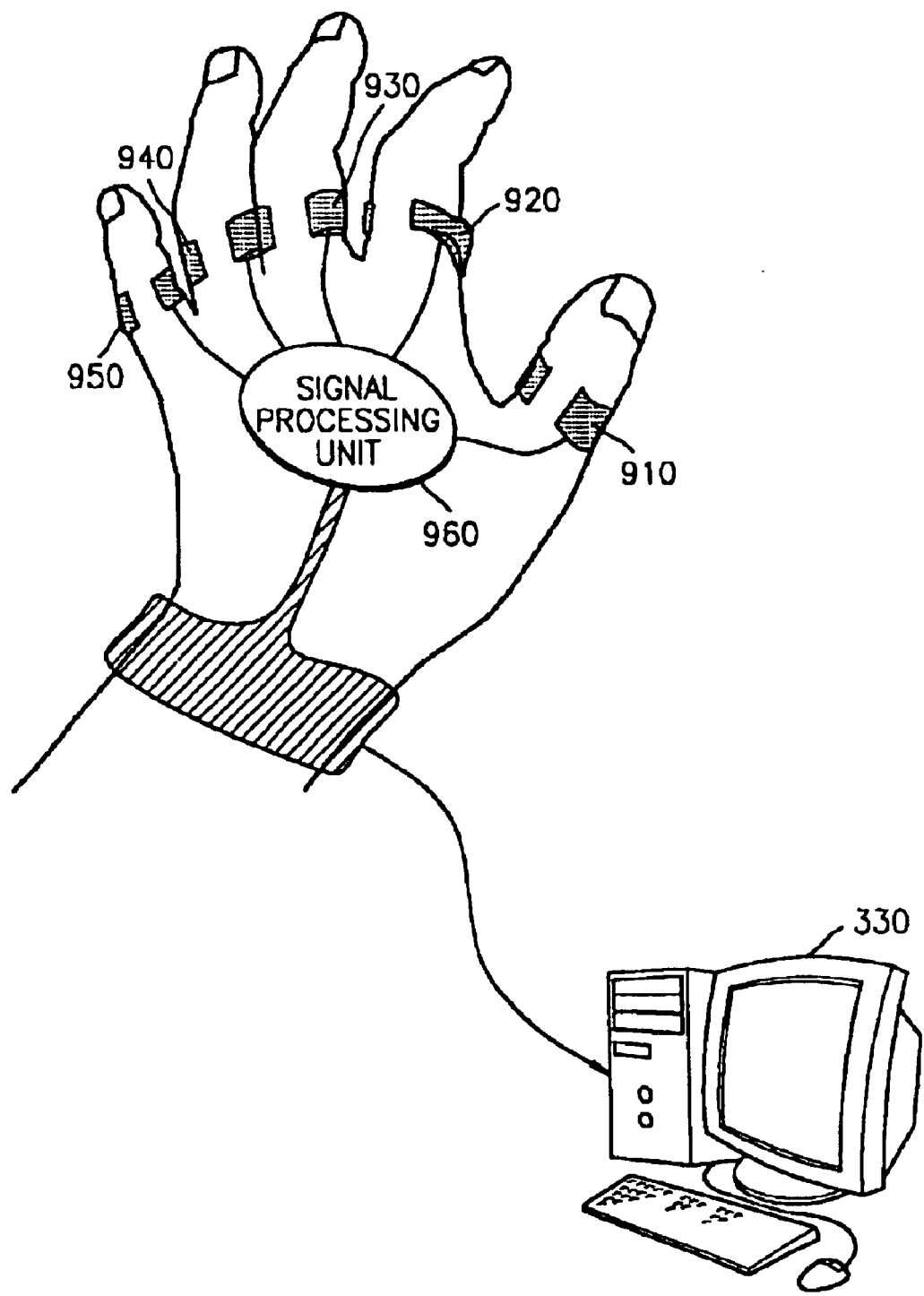
FIG. 9A is a diagram of an example of an information processing system according to the present invention.

As shown in FIG. 9A, in a case where sensing units 910, 920, 930, 940 and 950 are worn on all of the five fingers, five columns of a keyboard can be selected. If the extent of bending of each finger is divided into three steps, three rows can be selected from each column. Although a signal processing unit 960, which receives a distance signal sensed by the sensing units 910–950 and processes the signal, is mounted on the back of a user's hand in FIG. 9A, it may be mounted on places other than the back of the user's hand. The signal processing unit may be mounted on the user's wrist, for example, for convenience.

Figure 9B:
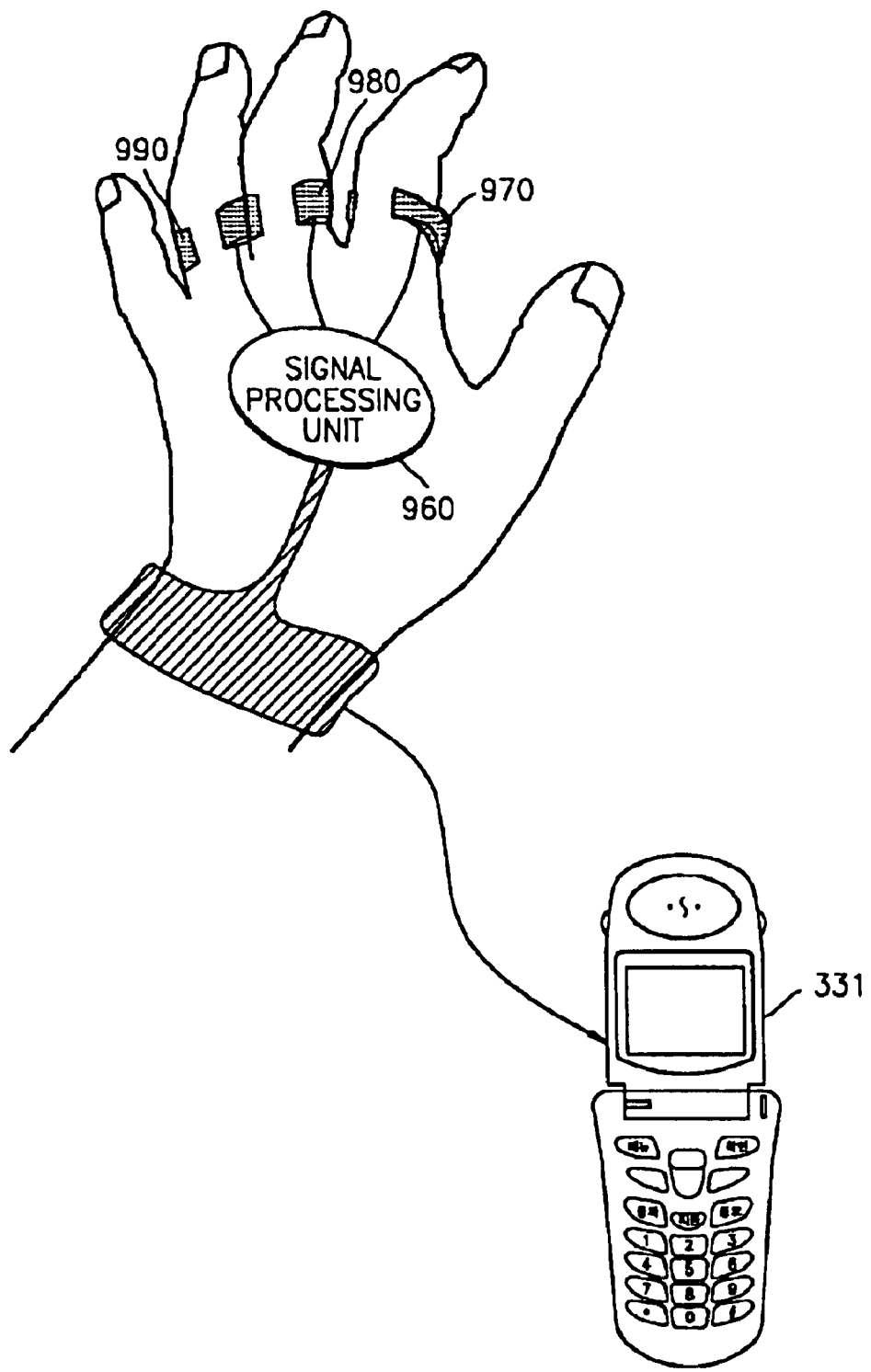
FIG. 9B is a diagram of an example of another information processing system according to the present invention.

As shown in FIG. 9B, since a keypad has three columns in the case of a cellular phone 331, sensing units 970, 980 and 990 can be worn on three fingers and keys can be selected from three columns of the keypad.

Figure 10:
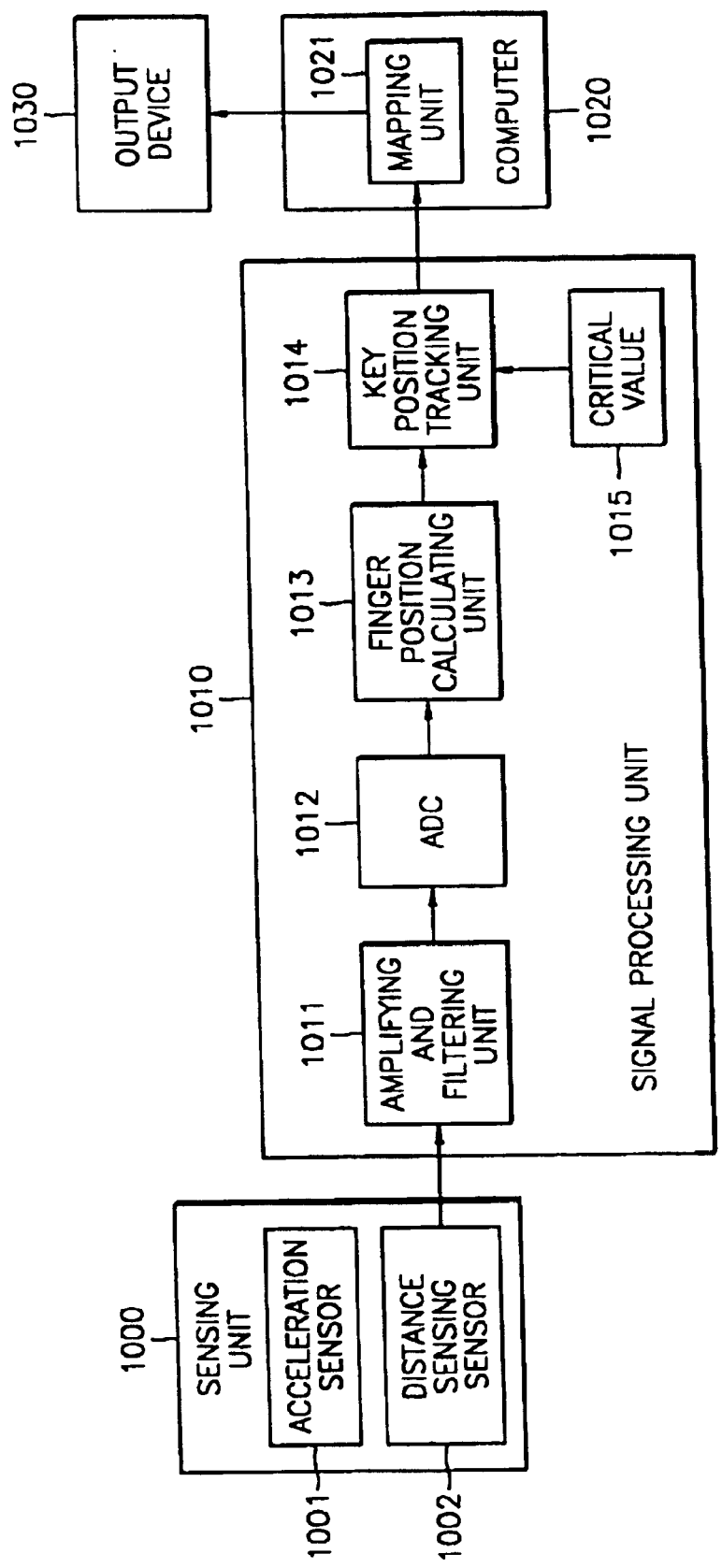
FIG. 10 is a schematic configuration block diagram of an information processing system according to the present invention.

Referring to FIG. 10, an example of an information input and processing device is described according to the present invention.

The information input and processing device of FIG. 10 can include a sensing unit 1000, a signal processing unit 1010, a computer 1020 and an output device 1030.

The sensing unit 1000 includes an acceleration sensor 1001 measuring an acceleration due to a finger movement and a distance sensing sensor 1002 sensing changes in the distance between predetermined portions of a finger according to the extent of bending of the finger.

The process of processing input information such as a "click" by the acceleration sensor 1001 is schematically described. A signal indicating the acceleration due to the movement of the user's finger, which is sensed by the acceleration sensor 1001, is a digital signal, and the digital signal is inputted to the signal processing unit 1010. The signal processing unit 1010 determines whether the digital signal corresponds to input information, by determining whether the signal exceeds the predetermined critical value or not. The information from the acceleration sensor can be inputted by sending the above result to the computer as a 1 or 0. Since the process of processing the input information is not essential to the present invention and the processing process can be embodied by the simple signal procedure as described above, a description thereof will be omitted.

The signal processing unit 1010 includes an amplifying and filtering unit 1011, which amplifies and filters an electrical signal received from the distance sensing sensor 1002 indicating a distance, an analog-to-digital converter (ADC) 1012 which converts an analog signal outputted from the amplifying and filtering unit 1011 into a digital signal, a finger position calculating unit 1013 which calculates a relative position of a finger using the digital signal outputted from the ADC 1012, and a key position tracking unit 1014 which tracks a position of a key selected by the finger though the relative positions of the finger outputted from the finger position calculating unit 1013, using critical values.

Explaining an operation of the finger position calculating unit 1013 in more detail, if changes in distance according to the extent of bending of a finger are, for example, from value 10 to value 150, the finger position calculating unit 1013 calculates that the signal received from the ADC 1012 exists in any point from the interval from value 10 to value 150.

The key position tracking unit 1014 receiving the calculated relative position of the finger from the finger position calculating unit 1013 tracks a position of a key selected by the finger using the critical values as shown in FIG. 8. The relative position of the finger is represented as a voltage in the graph of FIG. 8. As can be seen FIG. 8, the longer the distance between the sensor and the finger the higher the voltage, and the shorter the distance between the sensor and the finger the lower the voltage. It will be understood by those skilled in the art that, in fact, the shorter the distance between the sensor and the finger, the higher the voltage, that is, the higher the real signal. However, the result of FIG. 8 is obtained by shifting the real signal for the convenience of program coding in calculating the position.

If the voltage is between the critical value 1 (810) and the critical value 2 (820), key 1 is selected, if the voltage is between the critical value 2 (820) and the critical value 3 (830), key 2 is selected, and if the voltage is between the critical value 3 (830) and the critical value 4 (840), key 3 is selected. It will be understood by those skilled in the art that the number of critical values or the interval between the critical values can be suitably modified depending on the key input device. The position of a key tracked by the key position tracking unit 1014 is sent to a mapping unit 1021 included in the computer 1020. The signals sent from the signal processing unit 1010 to the computer 1020 include not only finger movement information measured by the distance sensing sensor 1002, but also click information sensed by the acceleration sensor 1001.

The mapping unit 1021 maps a logical position of the key received from the key position tracking unit 1014 into a physical key value of the key input device of the real computer 1020 and sends this value to the output device 1030. Here, the signal sensed by the acceleration sensor must be considered as the signal for information input.

Although critical values 1015 are set to basic values in manufacturing, since the size of a hand and a finger size varies from user to user, the steps of the critical values being set to the basic values is not suitable for all possible users. In order to supplement such drawback, a configuration of the information input device in which the critical values are adjusted is shown in FIG. 11.

Figure 11:
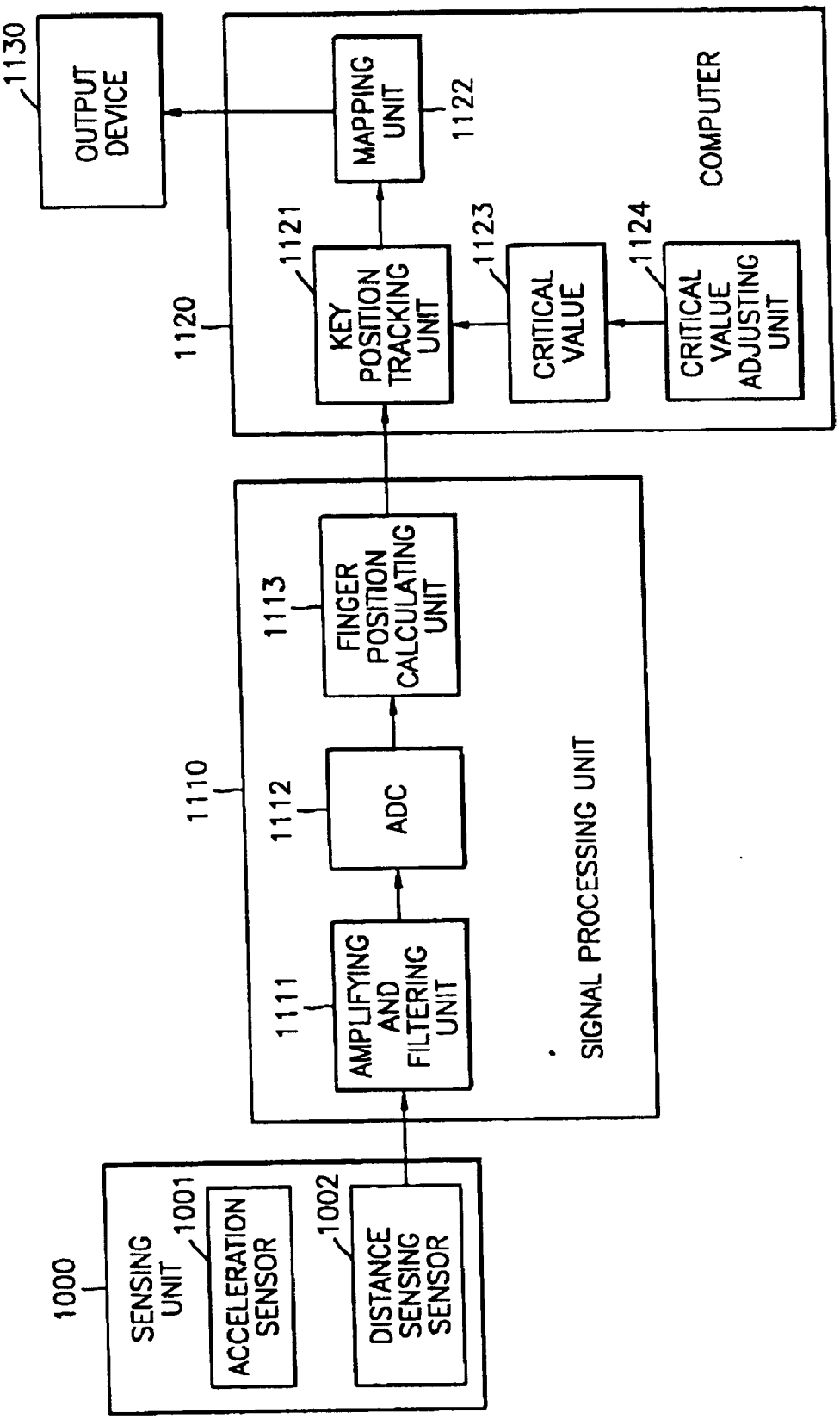
FIG. 11 is another schematic configuration block diagram of an information processing system according to the present invention.

In FIG. 11, a signal processing unit 1110 includes an amplifying and filtering unit 1111, an ADC 1112 and a finger position calculating unit 1113. A computer 1120 includes a key position tracking unit 1121, a critical value adjusting unit 1124 and a mapping unit 1122. The configuration of FIG. 11 is different from that of FIG. 10 in that the configuration of FIG. 11 further includes the critical value adjusting unit 1124 and the key position tracking unit 1121 in the computer 1120. However, a modification of the information input and processing device is not limited thereto. For example, the key position tracking unit 1121 and a critical value adjusting unit 1124 may be included in the signal processing unit 1110.

Figure 12:
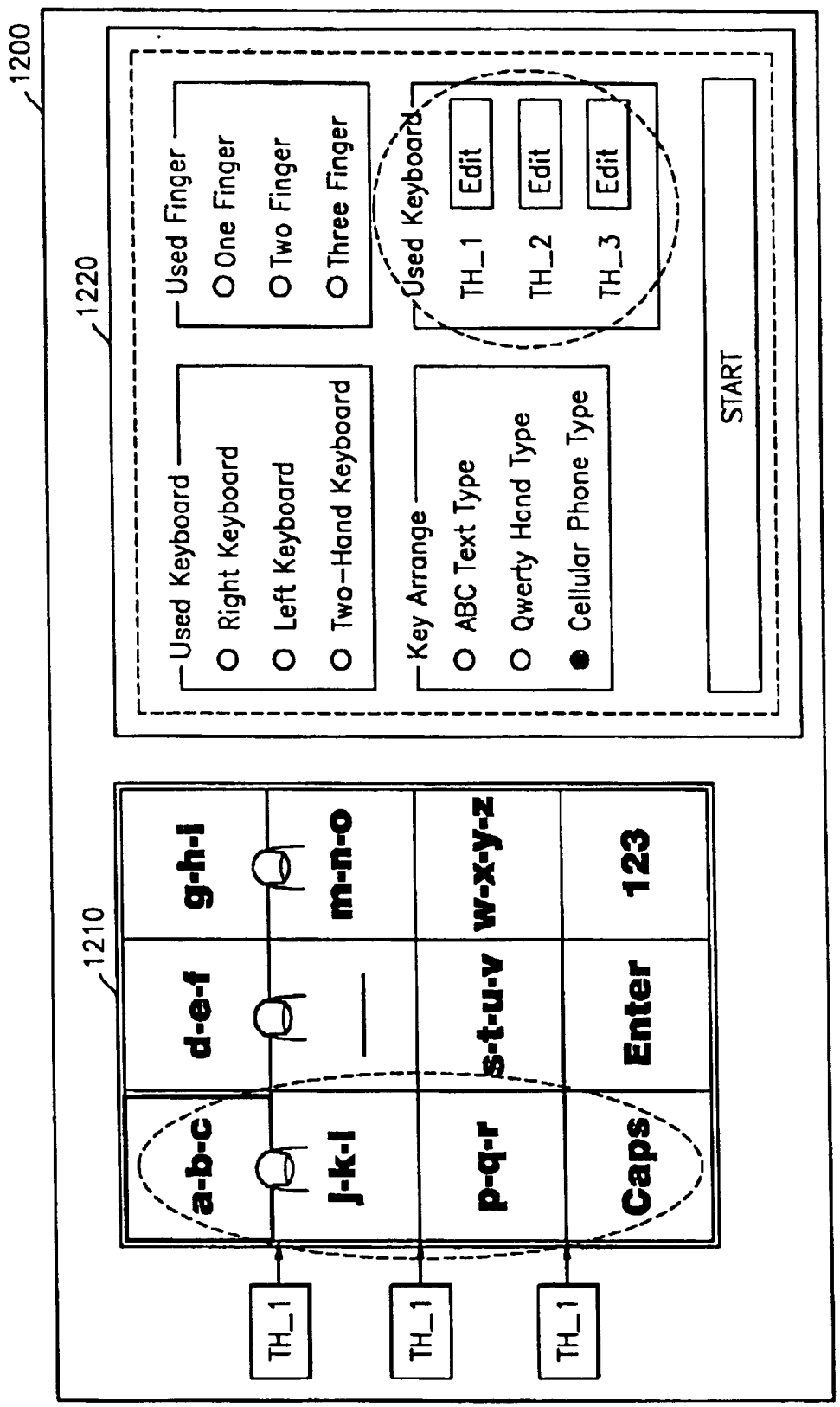
FIG. 12 is a diagram of a user interface for adjusting critical values.

Since the critical value adjusting unit 1124 includes an interface 1200 for a graphic user as shown in FIG. 12, the user can adjust the critical values.

A key arrangement 1210 is displayed on the left of the interface 1200 for the graphic user and a window 1220 used by a user to select a desired input device or set the critical values, is displayed on the right side of the interface 1200.

In the key arrangement 1210, a-b-c and j-k-l are distinguished by TH_1, j-k-l and p-q-r are distinguished by TH_2, and p-q-r and Caps are distinguished by TH_3. For example, when the user resets the critical values distinguishing keys of the leftmost column of the key arrangement 1210, the user selects the leftmost column of the key arrangement 1210 and inputs desired critical values to a "User Key Position" portion of the window 1220. Then, the user inputs the key using a real key input device. If the desired key is outputted to the output device, the set critical value set by the user is suitable. Otherwise, if the set critical value is unsuitable, the user must reset the critical value. With the above-described simple method, a user can set the critical values to be suitable for the user's hands or fingers.

Figure 13:
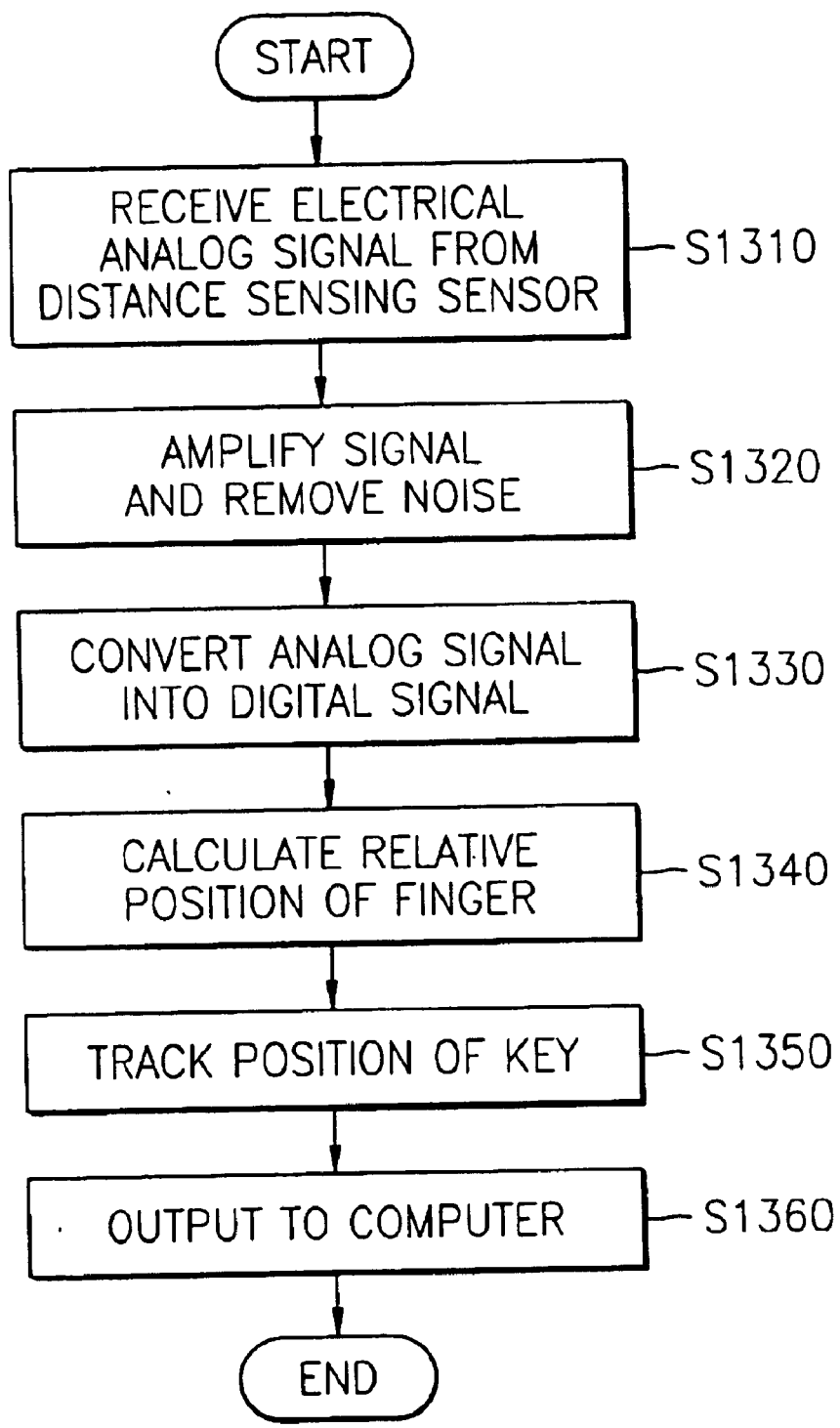
FIG. 13 is a flowchart of an example of an information input process according to the present invention.

The flow of operation of the signal processing unit shown in FIG. 10 is shown in FIG. 13.

The signal processing unit 1010 receives an electrical analog signal from the distance sensing sensor 1002 (S1310). The amplifying and filtering unit 1011 amplifies and filters the received signal, thereby removing noise (S1320). The signal from which the noise is removed is converted from an analog signal into a digital signal by the ADC 1012 (S1330). The finger position calculation unit 1013 calculates a relative position of a finger from the converted digital signal (S1340). Next, the key position tracking unit 1014 tracks the key position using the critical values (S1350). The tracked position of key tracked is outputted to the computer (S1360).

Figure 14:
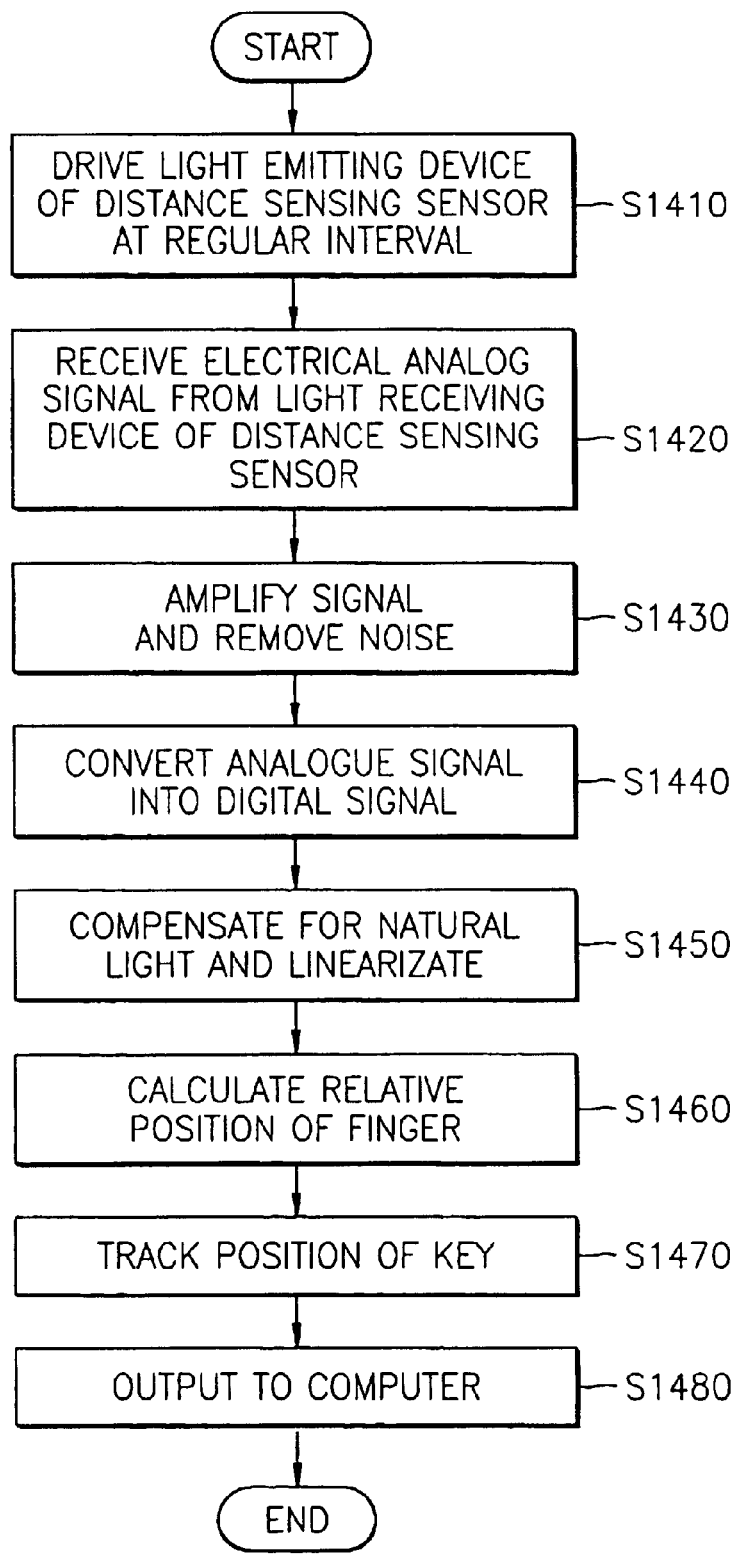
FIG. 14 is a flowchart of another example of an information input process according to the present invention.

Referring to FIG. 7, the light receiving device 304 of the distance sensing sensor 302 receives light which is output from the light emitting device 303 and is reflected by the user's finger. In this case, since the light receiving device 304 receives not only the light outputted from the light emitting device but also natural light, a quantity of radiation received from the light emitting device obtained based on the extent of bending of a user's finger can be different from a quantity of received natural light, and thus an error can occur in determining the extent of bending of a finger. A method capable of compensating for such error is shown in FIG. 14.

A microprocessor (not shown) included in the signal processing unit 1010 drives the light emitting device of the distance sensing sensor at a regular interval (S1410). Next, the signal processing unit receives an electrical analog signal from the light receiving device of the distance sensing sensor 1002 (S1420). The amplifying and filtering unit 1011 amplifies and filters the received signal, thereby removing noise (S1430). The signal is sent to the ADC 1012 and is converted from an analog signal into a digital signal by the ADC 1012 (S1440). A compensation unit (not shown in FIG. 10) compensates for natural light in the converted digital signal and carries out linearization (S1450). The reason for such compensation is that both light due to a finger bending and a natural light are received at the time of driving the light emitting device, and only the natural light is received at the time of not driving the light emitting device. Next, the finger position calculation unit 1013 calculates the relative position of the finger based on the compensated signal (S1460). The key position tracking unit 1014 tracks the position of a key using the critical values (S1470). The tracked position of the key is outputted to the computer (S1480).

Although the present invention describes the information input device worn only on the hand of the user's, the information input device may be mounted on any portion other than the hand of the user's, as long as the portion can be bent and the distance can be sensed based the extent of bending.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An information input device capable of being worn on a user's body comprising;
    a distance sensing unit which senses changes in distance between a predetermined portion and another predetermined portion of the user's body according to an extent of bending of a joint of the user's body; and
    a signal processing unit which processes the changes in distance sensed by the distance sensing unit, for selecting one or more information input items.

2. An information input device capable of being worn on a user's hand comprising;
    a distance sensing unit which senses changes in distance between a predetermined portion of a user's finger and another predetermined portion of the user's finger according to the extent of bending of the user's finger; and
    a signal processing unit which processes the changes in distance sensed by the distance sensing unit, for selecting one or more information input items.

3. The device of claim 2, wherein the predetermined portion of the user's finger is a portion between a fingertip and a third joint, and said another predetermined portion is at least one of a portion between a first joint and a second joint and a portion between a second joint and a third joint.

4. The device of claim 2, wherein the predetermined portion of the user's finger is a portion between a first joint and a second joint, and said another predetermined portion is a portion between a second joint and a third joint.

5. The device of claim 2, wherein the information input items comprise at least one of characters, numerals and symbols.

6. The device of claim 2, wherein the distance sensing unit is worn on the user's finger.

7. The device of claim 6, wherein the distance sensing unit is a ring.

8. The device of claim 2, wherein the distance sensing unit is worn on the user's hand.

9. The device of claim 8, wherein the distance sensing unit is a glove.

10. The device of claim 2, wherein the distance sensing unit is a reflective sensor.

11. The device of claim 10, wherein the signal processing unit comprises a compensation unit compensating for natural light in a signal indicating a distance sensed by the reflective sensor.

12. The device of claim 2, wherein the distance sensing unit is an ultrasonic sensor.

13. The device of claim 2, wherein the signal processing unit comprises:
    a finger position calculating unit which calculates a relative position of the user's finger based on the changes in distance sensed by the distance sensing unit; and
    a position tracking unit for determining which one of said one or more information input items corresponds to the calculated relative position of the finger, using critical values.

14. The device of claim 13, wherein the critical values are adjusted according to a user's intention.

15. The device of claim 2, further comprising an acceleration sensing unit which senses an acceleration determining input of the selected said one or more information input items.

16. An information processing device comprising:
    an information processing unit; and
    an information input unit capable of being worn on a user's hand comprising:
    a distance sensing unit which senses changes in distance between a predetermined portion and another predetermined portion of a user's finger according to the extent of bending of the user's finger; and
    a signal processing unit which processes the changes in distance sensed by the distance sensing unit, for selecting one or more information input items.

17. The device of claim 16, wherein the predetermined portion of the user's finger is a portion between a fingertip and a third joint, and said another predetermined portion is at least one of a portion between a first joint and a second joint and a portion between a second joint and a third joint.

18. The device of claim 16, wherein the predetermined portion of the user's finger is a portion between a first joint and a second joint, and said another predetermined portion is a portion between a second joint and a third joint.

19. The device of claim 16, wherein the distance sensing unit is worn on the user's finger.

20. The device of claim 19, wherein the distance sensing unit is a ring.

21. The device of claim 16, wherein the distance sensing unit is worn on the user's hand.

22. The device of claim 21, wherein the distance sensing unit is a glove.

23. The device of claim 16, wherein the signal processing unit comprises:
    a finger position calculating unit which calculates a relative position of a finger based on a distance signal sensed by the distance sensing unit; and
    a position tracking unit for determining which one of said one or more information input items corresponds to the calculated relative position of the user's finger, using critical values.

24. The device of claim 23, wherein the information processing unit comprises a mapping unit which maps said one of said one or more information input items determined by the position tracking unit, into a value capable of being output to an output device.

25. The device of claim 23, wherein the information processing unit comprises a critical value adjusting unit which adjusts the critical values using a user interface.

26. The device of claim 16, wherein the information processing device is one of a computer, a personal digital assistant (PDA), and a cellular phone.

27. A method of inputting information comprising;
sensing changes in distance between a predetermined portion and another predetermined portion of a user's finger according to an extent of bending of a user's finger; and
determining a selection of information input item using the sensed changes in distance.

* * * * *